Patented July 7, 1936

2,047,149

UNITED STATES PATENT OFFICE 2,047,149

COMPOSITION OF MATTER AND METHOD OF MAKING THE SAME

Walter J. Koenig and Robert H. Pohl, Philadelphia, Pa.

No Drawing. Application December 7, 1932, Serial No. 646,149

14 Claims. (Cl. 106—22)

This invention relates to plastic compositions and the method of making them, and particularly to oleaginous compositions capable of hardening when subjected to elevated temperatures, and the method of hardening the same, and the tough solid product resulting therefrom.

This invention, although applicable to plastics for numerous purposes including novelties, art objects, handles, utensils, etc., is of particular value for the manufacture of more or less flexible sheet materials in the nature of linoleums, e. g., for use as floor and wall coverings.

The present methods of manufacturing linoleum are of long standing in the industry and have not been fundamentally changed over a very long period of time. According to this present method, so-called "cements" are made up by oxidizing and polymerizing drying oils and are mixed with wood flour, ground cork, pigments, etc. The resulting compositions after sheeting and pressing, or molding into the form of tile or other objects, are cured at elevated temperatures until the oxidation and polymerization are substantially complete, and the desired drying and hardening of the mass has been attained.

The preliminary oxidation to form the cement and the final curing of linoleum and similar plastic products, because of the long time required, accounts for one of the most important items in the cost of manufacture of such products. According to ordinary practice, these materials must be cured on trays in heated ovens, or festooned in large heaters, for three weeks, or even longer, thus requiring excessive factory area for the ovens, and a large expense for the heating of these ovens.

Even after the plastics are treated in this manner, the product is far from perfect; there is a continued tendency for the material to harden, so that if it is stored over a period of a year or more, it may become too brittle to be rolled and unrolled without cracking.

It is an object of the present invention to eliminate the necessity for the long period of curing, and thereby to eliminate the excessive overhead and heating costs involved in the manufacture of such plastics. Another object of the invention is to provide a plastic composition which will remain permanently flexible, so that a year or even two years after it is made it will be substantially as flexible as a week after it is taken out of the oven. Another object of the invention is to provide a plastic composition of this character which will be highly resistant to alkalis, so that it can be washed with alkaline detergents repeatedly without objectionable effects.

Another object of the invention is to provide a plastic composition or linoleum cement which may be substantially free from tendency to dry or harden under ordinary atmospheric conditions.

With these and other objects in view, the invention contemplates the use, in a plastic composition, of a novel vehicle broadly described and claimed in the co-pending application of Walter J. Koenig, Serial Number 646,148 filed together with this application. We have found that the properties of this vehicle are such that when it is mixed with fillers, pigments and/or other ingredients of plastic composition, such as linoleum, etc., that both manufacturing advantages and advantages in the quality of the product are attained which are beyond what would be expected from the advantages found in the case of liquid coating materials. Thus, for example, where the drying time of a liquid coating composition may be reduced to one-fifth to one-seventh of the time required for equivalent curing of known drying oil compositions, a linoleum sheet may be dried to a more satisfactory product in two or three days than could have been accomplished with the known high quality linoleum cements in three weeks' curing,—that is to say, the time may be reduced to from one-seventh to less than one-tenth of that previously required, and the resulting product will be found far superior to that obtainable by known methods of manufacture, and with known compositions.

Furthermore, although in coating compositions such as are described and particularly claimed in the co-pending application above referred to, it is, with some compositions, necessary for the best results to include a phenolic resin or its equivalent for the purpose of preventing wrinkling. We have found that such ingredients are not necessary in the plastic compositions which form the subject-matter of the present application.

The vehicle or binder which we use in the plastics embodying the present invention is one which includes a drying oil and a substance having resin-forming characteristics,—that is, which is capable of condensation with the drying oil or with a constituent present in the drying oil at a moderately elevated temperature to form a resin. While we do not wish to be bound by any theory expressed herein, recognizing the possibility that the evidence may have been misinterpreted, we believe that the drying and hardening of the compositions of our invention results from a condensation reaction not requiring the presence of air or other oxidizing agent, and that the product of the condensation is a permanently flexible and stable resinous substance which is possessed of properties extremely desirable for plastics, particularly where flexibility and elasticity are of great importance. However, it will be understood by those skilled in the art that the properties of any particular composition embodying our invention will depend very largely upon the other ingredients of the composition, so that plastics made according to the present invention may be put to a wide variety of uses.

We have found that a wide variety of substances may be used as the resin-forming ingredient of the composition, and our experience with this type of composition has led up to the conclusion that any of the numerous compounds which are known to form resins by condensation reaction may be used in this way. Hundreds of such compounds have already been studied and their resin-forming characteristics demonstrated. We shall not attempt to enumerate all of these, but if it is remembered that the most desirable results are obtained when the resin-forming substance is one which is readily miscible in a drying oil and which serves by its condensation reaction to solidify the liquid or plastic vehicle or binder, those skilled in the art will have little difficulty in choosing materials suitable for the carrying out of our invention.

The substances which we have found the most advantageous for this purpose are those which condense with the drying oils, or with constituents present in the drying oils, at elevated temperatures, e. g., fatty acids and derivative products of the fatty acids or their glycerides, including aldehydes, glyoxal, etc. Ordinarily the reaction between the resin-forming substance and such derivative product, since it destroys the equilibrium in the reaction, will tend to increase the amount of derivatives in the oil. In some cases it will be desirable to speed up this reaction by means of catalysts, so that the liquid or plastic portion of the composition will be more rapidly converted into solid resinous substances.

By oxy-cyclic compounds we mean true saturated or true unsaturated oxy heterocyclic compounds, in which the element is oxygen, and true oxy carbocyclic compounds, having hydroxyl, keto, aldehyde or anhydride groups. By true saturated and true unsaturated oxy heterocyclic and true oxy carbocyclic compounds we mean that the compounds consist of hydrogen and carbon atoms and the above named oxy groups. Of course, through this description, methyl groups, etc., are included. We also include unsaturated unsubstituted heterocyclic compounds in which the element is oxygen, as such compounds will condense in accordance with the invention and apparently through an unsaturated linkage of the compounds. Both straight chain and cyclic compounds may be used, but we have found the latter more satisfactory. Compounds containing the hydroxyl radical which exhibit resin-forming characteristics, and which are particularly suitable for use in the present invention include, for example, phenol, naphthol, cyclohexanol, 4 acetyl 1-1 methyl cyclohexanol, 1,2,8,-trihydroxy-hexahydro-p-cymene, and di-acetone-alcohol. Ketones which are particularly suitable include cyclohexanone, methyl cyclohexanone, aryl-alpha-keto-tetrahydronaphthalene, homoterpenylic-methyl-ketone. Of the suitable aldehydes, we prefer to use furfuraldehyde. Phthalic anhydride may be used. This list could be multiplied indefinitely, since, as is well known, numerous compounds exhibit resin-forming characteristics and, in particular, are capable of condensation with products present in the oils.

Substances which catalyze the desired condensation reaction may also be included in the composition with advantage. Thus, for example, alkalies, e. g., sodium borate or acids, e. g., acetic or nitric acid, or finely divided metals, particularly aluminum, may be included in small amounts, and when included reduce the time of curing and/or preliminary treatment of the binder or vehicle.

Certain other materials, including zinc pigments, have been found to exert advantageous action upon the condensation, and tend to hasten the curing of the composition.

Driers, e. g., resinates of manganese, of lead, etc., may be used, but are not necessary. Their use tends to increase the hardness and brittleness of the dried composition, so that where permanent flexibility is desired, as in linoleum sheets, we prefer to use such driers, if at all, only in very small amounts, e. g., .01% of a led resinate and .001% of a manganese resinate, or even less; the percentages being based on the weight of the metal constituent of the resinate compared with the weight of the oil in the composition. Where a harder composition is desired, and particularly where somewhat increased brittleness is not objectionable, much larger amounts of drier may be used in the composition. Also, to some extent, the proportion of drier which will be permissible, given certain specifications as to hardness and brittleness, will depend upon the other ingredients of the composition. Thus, with certain oils, or with certain pigments and fillers, a higher percentage of drier may be used without objectionable effects than with other oils and other pigments or fillers.

A composition designed particularly for use in the manufacture of linoleum, but which may also be applied to other purposes, particularly decorative objects, molded building plaques, etc., may be as follows:

| | Parts by weight |
|---|---|
| Peruvian ochre, or other pigments | 15 |
| Wood flour | 10 |
| Ground cork | 50 |
| Gelled, or semi-solid vehicle | 60 |

This vehicle may, for example, consist of 120 parts of blown China wood oil, viscosity nine seconds Gardiner-Holt, at 86° F.
80 parts 25-gal. varnish (i. e., 25 gallons of China wood oil to 100 lbs. of phenol formaldehyde resin, such as Bakelite XR 420, or Durez 525),
17½ parts cyclohexanol,
17½ parts cyclohexanone.

The ingredients of the vehicle are refluxed at about 350° F. until gelled or solidified, and are then mixed with the other ingredients in a German or Banbury mixer, and calendered by means of rolls, in the usual way.

The phenol formaldehyde resin varnish ingredient in the above vehicle, although it appears to improve in some respects the properties of the composition, is not essential in this type of plastic, and this ingredient may, therefore, be omitted without substantially changing the other proportions in the formula.

For an inlaid linoleum, a similar procedure may be adopted, preferably, however, using a composition consisting of

| | Parts |
|---|---|
| Wood flour | 30 |
| Lithopone, or other pigments | 30 |
| Of the vehicle | 30 |

A liquid vehicle may be used instead of a gelled or semi-solid vehicle, as specified above. We have found that the liquid vehicle made, for example, the same as that specified above, except that the refluxing is stopped at a suitable viscosity, e. g., after thirty minutes to an hour, has tremendous wetting properties, so that a small amount can be used, and still get a suitable plastic material. A plastic made in this manner, with a liquid binder, is highly satisfactory for many purposes, and will set up nicely when cured at temperatures of 130° F., or thereabouts. There are, however, certain practical difficulties in the use of a plastic with a liquid vehicle in connection with existing linoleum machinery, and we prefer, therefore, to use the semi-solid or gelled vehicle, which approximately corresponds in consistency to the Bedford cements, or other cements commonly used in linoleum manufacture.

Instead of refluxing the vehicle as specified above, the composition may be blown. Where a volatile condensing substance such as cyclohexanol and cyclohexanone is used, it is ordinarily preferable to reflux at the boiling point of the condensing substance, but with less volatile resin-forming constituents, the blowing may be more economical and equally satisfactory. Even with materials such as cyclohexanone or cyclohexanol it may be blown instead of refluxed if a catalyst is used, e. g., finely divided aluminum, the reaction in this case being so far speeded up that the blowing treatment may be completed before excessive volatilization of the resin-forming constituent has occurred. The initial stage of the resin-forming condensation may often be combined with the preliminary blowing of the oil, the resin-forming constituent in this case being combined with the raw oil, and the mixture being blown until the desired viscosity is obtained.

Ordinarily the condensation reaction should not be carried to completion in this preliminary treatment, and even where the product is solidified, it is not completely hardened, but will still be capable of further condensation during the final heat treatment of the linoleum or other plastic.

A suitable vehicle may consist, for example, of

| | Parts, by weight |
|---|---|
| Raw China wood oil | 100 |
| Phenol | 10–20 |
| China wood oil fatty acids | 20–40 |

This mixture may be heated in a Bedford kettle to a temperature of about 180° F. and blown by turning the paddle at about 550 R. P. M., the treatment being continued until the vehicle has attained a semi-solid consistency about like that of Bedford cement.

The fatty acids in the above composition improve the properties of the binder, according to the amount used. Satisfactory results may be obtained with much less acid and phenol than is specified above, but the improvement resulting from increased acid and phenol fully justifies its use.

Linoleum compositions made as above described may be satisfactorily cured in three days to one week, or less at 140° F., as compared to three to six weeks with compositions which are now commonly used.

As already suggested above, a very important characteristic of the plastics made according to our invention is their resistance to alkalies. This is particularly important in floor coverings, where washing is frequently done with water containing strongly alkaline soaps, or even with lye or ammonia in the water. The linoleums made as described above will stand immersion in 5% caustic soda solution for four hours, or even for much longer periods, without any recognizable deterioration of the binder. This is in contrast to known linoleum compositions, which would be almost completely disintegrated by such a treatment.

In the formula above specified, the ingredients may be substantially varied without departing from the invention. Thus, for example, kettle-bodied oil may be used instead of blown oil, for example, an oil which has been bodied to a viscosity of 25 seconds to one minute as measured by the Gardner-Holt tube. We have found, however, that the alkali resistance of the composition is not so good when kettle-bodied oil is used as when blown oil is used, nor is the drying time so fast as for the blown oil. Kettle-bodied oils may be used satisfactorily if they are blown for a short time after being mixed with the resin-forming substance.

The drying time, surface and permanence of the dried films may be improved, and less unsaturated oils may be used if the initial condensation reaction is effected by at least a short blowing treatment, so that some oxidation occurs in the oil during this preliminary treatment, and particularly if free fatty acids of the drying oils have been added prior to the blowing treatment, or if oxidation products are added to the oil. This, we believe, may be because only that portion of the oil which is oxidized enters into the condensation reaction, and the oxidation decomposition products of the free fatty acids seem to act as a catalyst in the oxidation of the glycerides to form structures at the double bonds that would condense with the resin-forming substances to form a complete resin.

Other drying oils (in which term we include also the so-called semi-drying oils, and non-drying oils to which an unsaturated acid similar to the acids of the drying oils has been added, and even such drying oil fatty acids substantially without glycerides), for example, fish oil, linseed oil, and castor oil or soya bean oil to which fatty acids of China wood or linseed oil have been added, may be used similarly to China wood oil. It is our belief that oxidized oils, for the most part, enter the condensation reaction in the practice of this invention. We have also observed that the drying action of these compositions increases with the increased number of double bonds, and that the type of structures, when two or more double bonds are present in the straight chain, also makes a great difference. In such cases, the conjugate double bond structures, such as are present in China wood oil, dry faster and give better products from the standpoint of wear and alkali resistance than the structures having the interposed methylene groupings, such as linolic and linolinic acids and glycerides. This also holds true in the addition of fatty acids to the composition, in which case, as would be expected from the above, the unsaturated fatty acids of China wood oil give better results than those of linseed oil.

The conversion of non-drying oils into drying oils for the purposes of this invention,—that is, for drying by a resin-forming condensation as herein disclosed, may be effected by the addition of unsaturated fatty acids similar to those of the drying oils, as more fully described in the co-pending application of Koenig, Pohl and Walker, Serial Number 646,150 filed herewith. Even the non-drying oils, however, usually include at least one unsaturated double bond in their chemical structures and, as already indicated above, we regard this double bond as important in the condensation reaction, and, other things being equal, prefer to use the oils having a higher degree of unsaturation.

Where the properties of the plastic require a thinner vehicle or binder in order to give the desired plasticity for molding or sheeting, the initial preheating may be controlled to give a lower viscosity, or the material may be thinned, e. g., preferably with a resin-forming substance such as cyclohexanone. Petroleum thinners may also be used in this way, and other solvent thinners, such as hydroterpenes, pine oils, unoxidized terpineols, etc., may be used with less advantage.

The temperature of the preliminary heat treatment by which the initial stages of the condensation reaction are carried through may be varied over a considerable range from that suggested in the specific example given above. We may, for example, use a temperature of 160°, 180° or 200° F., with results in some respects better than when a temperature of 350° F. is used as suggested above, but with a somewhat longer period of heating. Ordinarily it is preferable to carry out this treatment at the boiling point of the mixture for whatever time may be required to give the desired viscosity. This time will ordinarily be from five minutes to one and one-half hours, depending upon the composition and upon the presence of catalysts. This preliminary treatment is desirable because it is possible in this way to carry through more economically the early stages of the condensation reaction. It is not, however, essential, and it is entirely practicable to mix the other ingredients with the blown oil, or even with the raw oil without the preliminary heat treatment, after which the paint may be cured at the same temperatures as with the formula as specified above, but for longer periods of time.

The curing of these compositions may take place at a temperature as low as 115° F., but much more satisfactory results are obtained if the curing is at temperatures between 130° and 140° F. Much higher temperatures may be used, even up to 300° F. The ideal temperature will vary for different compositions and according to the properties which are desired. When the non-drying oils converted by the addition of suitable fatty acids and resin-forming substances, as described above, or the fatty acids substantially alone, are used in the present invention, the curing temperatures should be higher, and ordinarily the times also should be longer. Thus, for example, with a composition of 10 parts phenol and 100 parts China wood oil fatty acids blown to 80° Doolittle, e. g., for one hour at 220° F., one-half pound air pressure, the drying may advantageously be carried out at about 220° F., for a period of about three and one-half hours. With a similar composition of linseed oil fatty acids, the temperature should be higher and the time longer. With soya bean oil and added China wood oil fatty acids, e. g., 20 parts of the fatty acids, 10 parts phenol, and 100 parts soya bean oil, blown to a high viscosity, for example, three hours at 200° F., one-half pound air pressure, the drying may be satisfactorily effected in seven hours at 220° F. With a similar composition of castor oil, the temperature should be somewhat higher, or the time somewhat longer.

These compositions, as already suggested above, dry very rapidly, and the drying may be carried out in inert atmospheres as well as in oxidizing atmospheres. In fact, the best results are obtained with inert atmospheres, e. g., where the atmosphere in the curing oven consists largely of the vapors of the vehicle, or of water vapor or other inert gas.

In referring herein to condensation of the resin-forming substance with the oil, we do not intend to imply that all of the oil necessarily enters into the reaction.

The word "pulverulent" is used herein to describe a granular material like ground cork, as well as a more truly powdered material like wood flour or pigments. "Vehicle" is used to define the resin-forming oleaginous composition or the liquid or semi-liquid portion of the composition, and is not intended to imply that the composition as a whole is liquid. "Drying" is used to denote the conversion of the oil or vehicle from a liquid or plastic condition to a condition in which it is no longer adhesive or subject to plastic flow. "Molding" is used broadly to define giving a desired shape to a plastic mass, whether this is done by definite forms or by rolling or pressing.

In the above specification, we have given examples and suggested certain modifications for the purpose of illustrating the invention, and without in any way attempting to exhaustively cover all the various modifications and applications of our invention. Similarly, we have expressed certain theories which we have developed in the course of our investigations and practical experience with this invention which we believe may be helpful to those who subsequently apply and extend the application of our invention. However, we have not as yet tested these theories sufficiently to set them up as certainly correct, and since the invention is in no way dependent upon the correctness of any theory which we have expressed, it is to be understood that the scope of our invention and claims is in no way limited thereby.

We claim:

1. An oleaginous plastic composition comprising ligneous fillers, pigments and a vehicle in amount adapted to give to the composition the desired plastic character, said vehicle comprising a condensation mixture in which the condensation reactants consist of oxidized drying oil having double bonds in conjugate arrangement and an oxy-cyclic organic compound adapted to react at super-atmospheric temperature.

2. An oleaginous plastic composition comprising ligneous fillers, pigments and a vehicle in amount adapted to give to the composition the desired plastic character, said vehicle comprising a condensation mixture in which the condensation reactants consist of oxidized drying oil having double bonds in conjugate arrangement and oxy-cyclic organic compounds adapted to react at super-atmospheric temperature.

3. A plastic composition as defined in claim 1, in which the oxy-cyclic compound is a hydroxy compound.

4. A plastic composition as defined in claim 1, in which the oxy-cyclic compound is a cyclic ketone.

5. A plastic composition as defined in claim 1, in which the oxy-cyclic compound is a cyclic aldehyde.

6. A plastic composition as defined in claim 1, in which the oxy-cyclic compound is a phenol.

7. A plastic composition as defined in claim 1, in which the oxy-cyclic compound is cyclohexanol.

8. A plastic composition as defined in claim 1, in which the oxy-cyclic compound is cyclohexanone.

9. A linoleum product comprising a ground ligneous material and a flexible resinous binder comprising a condensation mixture in which the condensation reactants consist of oxidized drying oil having double bonds in conjugate arrangement and an oxy-cyclic organic compound.

10. A linoleum product comprising a ground ligneous material and a flexible resinous binder comprising a condensation mixture in which the condensation reactants consist of oxidized drying oil having double bonds in conjugate arrangement and oxy-cyclic organic compounds.

11. The method of making a massive article which comprises mixing fillers and an oleaginous vehicle comprising a condensation mixture in which the condensation reactants consist of oxidized drying oil having double bonds in conjugate arrangement and an oxy-cyclic organic compound and curing at super-atmospheric temperature.

12. The method as described in claim 11, in which the final curing of the shaped mass is carried on in the substantial absence of oxygen.

13. The method of making a massive article which comprises mixing fillers and an oleaginous vehicle comprising a condensation mixture in which the condensation reactants consist of oxidized drying oil having double bonds in conjugate arrangement and oxycyclic organic compounds and curing at super-atmospheric temperature.

14. The method as described in claim 13, in which the final curing of the shaped mass is carried on in the substantial absence of oxygen.

WALTER J. KOENIG.
ROBERT H. POHL.